United States Patent Office 3,393,200
Patented July 16, 1968

3,393,200
METAL-CONTAINING PHTHALOCYANINES
William E. Bachmann, North Haledon, N.J., and Herman Gerson, New York, N.Y., assignors to Allied Chemical Corporation, New York, N.Y., a corporation of New York
No Drawing. Filed Oct. 23, 1965, Ser. No. 504,212
15 Claims. (Cl. 260—314.5)

ABSTRACT OF THE DISCLOSURE

A process for producing improved yields and quality of metal-containing phthalocycanines comprising reacting a significant amount, i.e., at least 0.1 mole equivalents to about 1.25 mole equivalents, of a mono alkali metal salt of a phthalic acid together with about a 3-mole portion of a phthalocyanine intermediate which may be phthalic acid, phthalic anhydride, a phthalic acid ester, an ammonium salt of phthalic acid, a phthalodiamide, a phthalimide and mixtures thereof, a nitrogen donor, a metal donor, a phthalocyanine forming catalyst, and a high boiling non-reactive organic solvent, and separating metal phthalocyanine from the resultant reaction mixture.

This invention relates to improvements in the synthesis of metal-containing phthalocyanines. More particularly it relates to improvements in the synthesis of unhalogenated and monohalogenated metal-containing phthalocyanines with higher yields and generally better quality than obtained by prior art procedures.

Metal phthalocyanines and their halogenated derivatives are valuable organic pigments noted for their clarity of shade and fastness properties. Monochloro copper phthalocyanine is particularly desirable in view of its non-crystallizing character. Various processes have been proposed for the synthesis of metal phthalocyanines. One that has found favor for the preparation of pigments of relatively low halogen content is the so-called "urea process," which involves the reaction of:

(1) A phthalocyanine intermediate, such as a phthalic acid compound (it being understood that where phthalic acid or its derivatives are referred to herein, orthophthalic acid or its derivatives is intended) examples of such phthalic acid compounds being phthalic anhydride, an ammonium salt of phthalic acid, a phthalodiamide, a phthalimide or mixture or two or more of the said intermediates;

(2) A polyvalent, such as magnesium, aluminum, nickel, copper and the like, the oxides of these metals, the inorganic salts (e.g., chlorides, bromides, nitrates, phosphates, sulfates, etc., of these metals), the organic salts (such as the oxalates, succinates, phthalates, acetates, etc. of these metals), or mixtures of such metal donor substances;

(3) A nitrogen donor, such as urea or a derivative thereof, for example biuret, guanidine, guanidylurea, dicyandiamide, cyanuric acid, and mixtures thereof;

(4) A catalyst which promotes the formation of metal phthalocyanines, such as ammonium molybdate or other compound of a metal of Group IV, V or VI of the Periodic System having an atomic number of from 22 to 92 inclusive, as well as mixtures of such catalysts, including, for example, ammonium borotungstate, ammonium phosphomolybdate, and phosphotungstomolybdic acid; and (5) An inert high boiling non-reactive organic solvent, such as nitrobenzene, trichlorobenzene, o-dichlorobenzene, kerosene, naphthalene, and mixtures of such solvents.

The reaction involving the above components is generally carried out at a reaction temperature within the range of about 170° to about 215° C.

When this urea process is employed for the preparation of metal phthalocyanines from alkali metal acid phthalates (e.g., monoalkalimetal salts of phthalic acid and polyhalogenated phthalic acids) as the phthalocyanine intermediates, only low yields of metal phthalocyanines of unsatisfactory purity are obtained and extensive purification steps are required to meet commercial specifications. The metal-containing phthalocyanines, and especially the polyhalogenated derivatives, are obtained in a form generally unsuitable for pigment use. While they may be conditioned for such use by well known techniques, such as acid-pasting, salt-grinding, sand-grinding, etc. the yields obtained are low, and the products obtained require extensive conditioning and purification to convert them into pigments of commercially acceptable quality.

The monohalogenated metal phthalocyanines particularly the fluorine, chlorine and bromine derivatives containing at most about 1.2 atoms of halogen per molecule of phthalocyanine can be prepared by several known procedures.

One such procedure involves the reaction of about one mole of monohalogenated phthalic anhydride with about three moles of phthalic anhydride using the conventional "urea process" technique. This process gives only fair yields, generally 90% or less. However, the monohalogenated phthalic anhydrides are not commercially available and are difficult and expensive to synthesize.

Another well-known process, utilizes the more readily available monosodium chlorophthalate and involves the steps of treating this acid salt with an aqueous mineral acid solution and evaporation of the water, prior to addition of phthalic anhydride and other reactants and proceeding according to the conventional "urea process." This procedure, while giving acceptable yields in the range of about 92%, requires the additional and expensive steps of acidification of the sodium salt with a corrosive solution and evaporation of water and volatile acid (when a halogen acid, e.g., muriatic acid) is used.

It is therefore a principal object of this invention to provide an improved process for synthesizing metal phthalocyanines.

Another object is to provide improvements in the preparation of metal phthalocyanines by the urea process from mono-alkali metal salts of o-phthalic acids and the monohalogenated derivatives thereof.

A further object is to provide an improved process for the preparation of copper phthalocyanine and monochlorinated copper phthalocyanine by a modification of the urea process.

Other objects and advantages of this invention will be obvious from the following description.

We have now found that metal phthalocyanines can be synthesized by a modification of the urea process which involves the use, as the phthalocyanine intermediate, of a mixture of at least 3 mol-proportions of phthalic anhydride or other phthalocyanine forming derivative of phthalic acid and a significant amount but not substantially more than about 1 mol proportion of an alkali metal salt of a member of the group consisting of phthalic acid and monohalogenated phthalic acid. By the term "alkali metal" salt we intend to include alkali metals such as sodium, lithium, and potassium, but not ammonium which is often considered to be the equivalent of the alkali metals.

In accordance with the present invention, we have made the discovery that the inclusion of a significant amount, i.e., at least 0.1 mol. eq. to about 1.25 mol. eq., of an alkali metal salt of a phthalic acid for every 3 mol-proportion of phthalocyanine intermediate in the conventional reaction mixtures comprising a phthalocyanine intermediate a nitrogen donor, a metal donor, a catalyst, and a solvent, results in high yields of metal-containing phthalocyanines of excellent quality. By this improvement, which utilizes readily accessible phthalocyanine intermediates, the production of valuable phthalocyanine pigments may be efficiently and economically carried out.

The prior art of phthalocyanine manufacture has avoided mention of the utilization of alkali metal salts of phthalic acids as phthalocyanine intermediates. While we do not propose to understand fully the reasons for this avoidance, we suspect that it was believed that the alkali metal salts of phthalic acids would not be reactive in the ammoniacal milieu. Inasmuch as alkali metals salts, e.g., sodium salts, are generally more basic than the corresponding ammonium salts, and hence the alkali metal salts, when used in the prior art have been acidified prior to reaction with the nitrogen donor, catalyst, etc.

It was, therefore, unexpected to discover that the presence of alkali metal salts of o-phthalic acids in the phthalocyanine forming reaction mixtures in amounts not exceeding about 1.25 mol equivalents did not alter the course of the desired reaction. This discovery was all the more surprising in view of the fact that when an alkali metal acidphthalate alone is used as the phthalocyanine intermediate, the yield of the desired metal-containing phthalocyanine was only about 30% of the theoretical value.

In carrying out the improved process of the present invention, the mixture of alkali metal o-phthalate and phthalic anhydride (or equivalent) is added together with the nitrogen donor, metal donor, catalyst and sufficient solvent to provide a fluent, i.e., stirrable reaction mixture. The mixture is agitated and heated to the reaction temperature ranging from about 150° C. to 240° C., and desirably maintained thereat for a reaction period of several hours, nominally about 3 to 7 hours. The mass on being cooled to ambient temperature deposits the metal-containing phthalocyanine product which is separated by filtration, or other convenient mode, and treated in a conventional manner to recover product free of acidic and/or alkaline reacting salts, as by extraction with boiling water, washing with dilute alkali and with water. The product so obtained, in yields of 90% and higher of the theoretical amount, can be readily conditioned by known methods (acid-pasting, sand grinding, etc.) to convert it to valuable pigment form.

The advantages of the invention are of particular interest in the preparation of mono halogenated metal- containing phthalocyanines, especially monochloro-copper phthalocyanines. As indicated above, monochlorophthalic anhydride is not readily obtainable, whereas sodium acid-monochlorophthalate is. The process of the present invention, since it makes possible the direct utilization of the commercially available product has a difinite economic advantage. Although copper monochlorophthalocyanine contains 5.8% chlorine, copper chlorophthalocyanines containing up to about 7% (and hence being mixtures of mono- and polychlorophthalocyanines) are considered to be "copper monochlorophthalocyanine." Likewise copper chlorinated phthalocyanines containing less than the theoretical amount of chlorine for the mono chloro derivative, e.g. as little as 2% chlorine (and hence being mixtures of halogen free and monochloro-copper phthalocyanine) are considered to be monochloro-copper-phthalocyanine.

Monochloro-copper-phthalocyanine because of its superior non-crystallizing character and desirable greenish blue shade is a valuable pigment used either alone or in admixture with other metal-containing phthalocyanine.

While the advantages of this invention are obtainable with mixtures of an alkali metal o-phthalate and phthalic anyhdride as the phthalocyanine intermediate, the latter component of the mixture can be replaced, in whole or in part, with phthalic acid or other derivatives of phthalicacid. Typical of such phthalocyanine intermediates which can replace phthalic anhydride in this instance are: phthalic acid, ammonium acid phthalate, diammonium phthalate, phthalic diamide and phthalimide. Mixtures of the foregoing derivatives with each other and/or with equivalent materials can also be employed. Phthalic anhydride because of its general effectiveness, ready availability and relatively low cost, is the preferred derivative of phthalic acid in this procedure.

The amounts of the other reactants used to form the reaction mass can be varied over a wide range, in accordance with the known art of preparing phthalocyanines by the urea process. For example, based on the amount of phthalocyanine intermediate present in the reaction mass:

(a) The amount of urea or other nitrogen donor can be varied from 1 to 15 or more times by weight.

(b) The amount of metal doner can be from about 110% to about 200% atomic equivalent weight.

(c) The amount of catalyst can be the usually small catalytic quantity, of the order of from 0.1% to 10% by weight of the phthalocyanine intermediate.

(d) The amount of solvent is generally at least that amount which provides a stirrable reaction mass. Larger proportions can and usually are used; but excessive amounts are obviously wasteful, increase the heating requirements of the process, and increase the difficulty and expense of removal and recovery of this optional component.

The urea process is conventionally carried out at elevated temperatures, i.e., above about 150° C., and as high as about 240° C. in some instances, but generally within the range of about 170° to about 215° C. The optimum temperature will usually depend upon the specific metal phthalocyanine being produced. In most instances we find it to be desirable to operate our novel process within the temperature range of about 180° to about 210° C. and preferably within the range of 190° to 200° C.

The advantages of our improved procedure are most striking and most valuable in the preparation of monochlorinated copper phthalocyanines, wherein yields in excess of 92% of theory and of excellent quality are obtained. The benefits of this invention also may be obtained, however, in the synthesis of metal phthalocyanines wherein the metal is other than copper and the halogen is other than chlorine. Typical of such other metals are nickel, cobalt, iron and zinc. Typical of such other halogens are fluorine and bromine.

The following examples describe specific embodiments of our invention and illustrate the best method contemplated for carrying it out; but they are not to be interpreted as limiting the invention to all details thereof, since changes can be made without departing from the scope or spirit of the invention. Parts and percentages are by weight and temperatures are in degrees centigrade.

The monosodium-4-chlorophthalate is employed in the form of a technical product having the following approximate analysis, by weight:

| | Percent |
|---|---|
| Monosodium-4-chlorophthalate | 65 |
| Monosodium-3-chlorophthalate | 3 |
| Monosodium phthalate | 12 |
| Monosodium-3,4-dichlorophthalate | 5 |
| Monosodium-4,5-dichlorophthalate | 8 |
| Essentially sodium chloride | Balance |

Example I

A mixture consisting of 48 parts of technical monosodium-4-chlorophthalate, 117 parts of phthalic anhydride, 250 parts of urea, 29 parts of cuprous chloride, 0.45 part of ammonium molybdate and 1000 parts of trichlorobenzene was agitated and gradually heated to 195°. The mixture was maintained at 195° to 200° for five hours and then cooled to below 100°. The product slurry was filtered, vacuum dried, and ground and then reslurried in 1500 parts of 4% aqueous sodium hydroxide. The slurry was heated to and maintained at boiling for two hours with live steam. The slurry was filtered and washed alkali-free with hot water. The wet cake was reslurried in a mixture of 1500 parts of water and about 230 parts of 20° Bé. hydrochloric acid. This slurry was heated to and maintained at boiling for one hour with live steam and filtered. The filter cake was washed acid free with hot water and then dried at 80°. The dried product copper monochlorophthalocyanine (containing 4.49% chlorine) weighed 149.0 parts which represents 98% of the theoretical yield. The product was of excellent quality.

Example II

A mixture of 64.6 parts of technical monosodium-4-chlorophthalate, 117.0 parts of phthalic anhydride, 300 parts of urea, 31.9 parts of cuprous chloride, 0.5 part of ammonium molybdate and 1000 parts of trichlorobenzene was processed, in the manner described in Example I above, to copper monochlorophthalocyanine (containing 6.14% chlorine). The dried product of this example weighed 150.8 parts, which represents about 93% of the theoretical yield. The product was of excellent quality.

Example III

Part A.—A mixture of 51 parts of monopotassium phthalate (essentially chemically pure), 117 parts of phthalic anhydride, 350 parts of urea, 31.9 parts of cuprous chloride, 0.5 part of ammonium molybdate and 1000 parts of trichlorobenzene was gradually heated to 195° and maintained at 195° to 200° for about 6 hours. The mass was cooled to below 100° and filtered. The filter cake was washed with alcohol to remove residual trichlorobenzene and then reslurried in about 1500 parts of water containing about 60 parts of sodium hydroxide. The alkaline slurry was boiled with live steam for about 2 hours. The slurry then was filtered and washed alkali free with hot water. The washed cake was reslurried in about 1500 parts of water containing about 200 parts of 20° Bé. hydrochloric acid. The acid slurry was boiled with live steam for about one hour and then filtered. The filter cake was washed free of acid and soluble salts with hot water. The washed cake was dried at 80°. The product copper phthalocyanine was obtained in a yield of about 93% of the theoretical amount, and was of excellent quality.

Part B.—Repetition of the process of Part A of this example but using 215 parts of potassium acid phthalate and no phthalic anhydride, results in a yield of only 46.9 parts of dried product. This is equivalent to only 31% of the theoretical yield.

It can thus be seen that an efficient and readily operated process for the synthesis of metal-containing phthalocyanines in excellent yield and quality has been devised.

We claim:
1. In a process for preparing a metal phthalocyanine by heating a reaction mixture containing a phthalocyanine intermediate, a nitrogen donor, a metal donor, inert solvent and a catalyst, the improvement which comprises employing as said phthalocyanine intermediate both (1) a first phthalocyanine intermediate selected from the group consisting of phthalic acid, phthalic anhydride, a phthalic acid ester, an ammonium salt of phthalic acid, a phthalodiamide, a phthalimide and mixtures thereof and (2) a second phthalocyanine intermediate selected from the group consisting of a mono alkali metal salt of phthalic acid and a monoalkalimetal salt of monohalogenated phthalic acid, said second phthalocyanine intermediate being present in proportions of from about 0.1 mole equivalents to 1.25 mole equivalents for every 3 moles of said first phthalocyanine intermediate present in the mixture.

2. The process of claim 1 wherein said first and second phthalocyanine intermediates are present in a mole ratio of about 3:1 respectively.

3. The process of claim 1 wherein said second phthalocyanine intermediate is a mono-alkali metal salt of o-phthalic acid.

4. The process of claim 1 wherein said second phthalocyanine intermediate is a mono-alkali metal salt of a monohalogenated o-phthalic acid.

5. The process of claim 1 wherein said second phthalocyanine intermediate is monosodium-4-chlorophthalate.

6. The process of claim 1 wherein said first phthalocyanine intermediate is phthalic anhydride.

7. The process which comprises heating, to a temperature of from about 150° C. to about 240° C., a reaction mixture comprising about 1 mole of a mono-alkali metal salt of phthalic acid, about 3 moles of a phthalocyanine intermediate selected from the group consisting of phthalic acid, phthalic anhydride, a phthalic acid ester, an ammonium salt of phthalic acid, a phthalodiamide, a phthalimide and mixtures thereof, a nitrogen donor, a metal donor, a phthalocyanine forming catalyst, and a high boiling non-reactive organic solvent, and separating metal phthalocyanine from the resultant reaction mixture.

8. The process of claim 7 wherein said mono-alkali metal salt is monopotassium phthalate.

9. The process of claim 7 wherein said mono-alkali metal salt is an alkali metal salt of 4-chlorophthalic acid.

10. The process of claim 8 wherein said alkali metal salt is monosodium-4-chlorophthalate.

11. The process of claim 7 wherein said metal donor is a copper compound and copper monochlorophthalocyanine is separated from the reaction mixture.

12. The process of claim 10 wherein said copper compound is cuprous chloride.

13. The process of claim 7 wherein said nitrogen donor is urea.

14. The process of claim 7 wherein said phthalocyanine forming catalyst is ammonium molybdate.

15. The process of claim 7 wherein said solvent is trichlorobenzene.

References Cited

UNITED STATES PATENTS 3,300,512   1/1967   Bachmann et al. ____ 260—314.5

JOHN D. RANDOLPH, *Primary Examiner.*

WALTER A. MODANCE, *Examiner.*

HARRY S. MOATZ, *Assistant Examiner.*